May 27, 1930.  C. R. BOGGS  1,759,883
ELECTRIC CABLE
Filed April 12, 1928
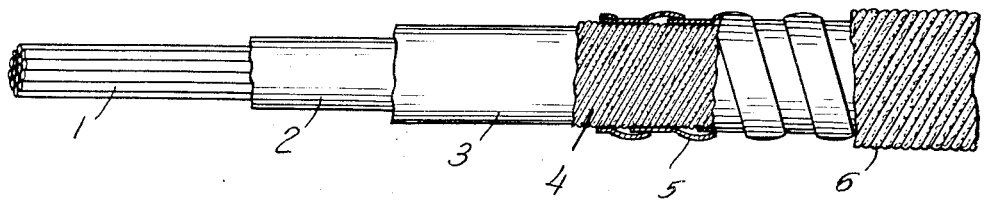
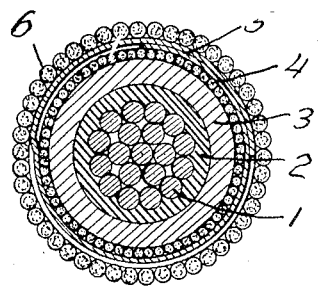
INVENTOR
Charles R. Boggs
BY
ATTORNEYS Patented May 27, 1930

1,759,883

UNITED STATES PATENT OFFICE

CHARLES R. BOGGS, OF WABAN, MASSACHUSETTS, ASSIGNOR TO SIMPLEX WIRE AND CABLE COMPANY, OF BOSTON, MASSACHUSETTS, A CORPORATION OF MASSACHUSETTS

ELECTRIC CABLE

Application filed April 12, 1928. Serial No. 269,341.

This invention relates to improvements in armored insulated electric cables. The invention provides an improved cable construction having several important advantages; the improved cable of the invention is of simplified construction, it permits the use of an "exploring coil" to locate breaks or faults, it affords particularly complete protection and has improved resistance to crushing, it minimizes losses. The combined features of the improved cable of the invention cooperate to give all of these advantages in combination.

The improved cable of the invention will be described in detail in connection with the accompanying drawings, which illustrate, somewhat diagrammatically, in Fig. 1, a fragment of a cable embodying the invention with parts broken away and in Fig. 2 a section of the same cable.

The improved cable of the invention comprises essentially an insulated conductor or group of conductors covered with a layer of cushioning material encased in armor consisting of a single helically wound arched zinc tape, successive turns overlapping, covered with another layer of cushioning material. Referring to the drawings, the cable illustrated comprises a stranded conductor 1 covered with rubber insulation 2 jacketed in a lead sheath 3 covered with a layer of jute 4 encased in armor of zinc tape 5 covered with another layer of jute 6. The cable illustrated is of single conductor type; the invention is also useful in connection with multi-conductor type cables. That part of the cable within and including the lead sheath 3 may be of any conventional type of construction; the lead sheath 3 is advantageous but is not essential. To secure the advantages of the invention, however, the arrangement of the elements including the armor layer and the layers of cushioning material on each side of the armor layer surrounding the insulated or sheathed and insulated conductor or group of conductors must be precisely as described and illustrated. The armor proper consists of a single arched zinc tape 5 wound helically on the inside layer of cushioning material so that the edge of each succeeding turn overlaps or interlocks with the preceding turn to form an armor layer flexible yet complete and free from interstices opening radially therethrough. The zinc tape is non-magnetic and also non-rusting. This armor layer is arranged between inside and outside layers of cushioning material which not only assist the armor proper in protecting the cable interior but which also serve to protect the armor, particularly from localized stresses. The exact cushioning material employed in these layers within and without the armor layer is not essential but jute is a particularly advantageous material for this purpose. As will be apparent from the foregoing, the improved cable of the invention is free from magnetic elements.

In the improved cable of the invention, the armor proper, although consisting of but a single zinc tape, completely encases the interior of the cable affording a maximum of protection. Among other advantages, the simplicity of this construction insures the maintenance of maximum protection during installation and throughout the use of the cable. The inside and outside layers of cushioning material cooperate with the armor layer in this respect, protecting the interior of the cable and also the armor proper, and thus might be considered as forming, with the zinc tape, a composite armor. The arched zinc tape improves the flexibility as well as the strength of the armor proper. Particularly with respect to single conductor cables for alternating current installation, electrical losses are reduced. The freedom of the cable from magnetic elements permits the direct use of an "exploring coil" in the conventional manner. Cables having certain advantages of the invention severally have been previously proposed, but this invention provides for the first time a cable construction having all of the advantages of the invention conjointly.

I claim:

1. An armored insulated electric cable, consisting of an insulated conducting element covered with a layer of cushioning material encased in an armor layer covered with another layer of cushioning material, said armor layer consisting of a single helically wound arched zinc tape the successive turns of which overlap to form a single armor layer free from interstices opening radially therethrough, said cable being free from magnetic elements.

2. An armored insulated electric cable, consisting of an insulated conducting element sheathed in lead and covered with a layer of jute encased in an armor layer covered with another layer of jute, said armor layer consisting of a single helically wound arched zinc tape the successive turns of which overlap to form a single armor layer free from interstices opening radially therethrough, said cable being free from magnetic elements.

In testimony whereof I affix my signature.

CHARLES R. BOGGS.